United States Patent
Lipson

(10) Patent No.: US 11,777,156 B2
(45) Date of Patent: Oct. 3, 2023

(54) METHOD FOR RECOVERING AND RECYCLING ELECTROLYTE SALTS FROM LITHIUM BATTERIES

(71) Applicant: UCHICAGO ARGONNE, LLC, Chicago, IL (US)

(72) Inventor: Albert L. Lipson, Oak Park, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 266 days.

(21) Appl. No.: 17/149,859

(22) Filed: Jan. 15, 2021

(65) Prior Publication Data

US 2022/0231350 A1    Jul. 21, 2022

(51) Int. Cl.
| | |
|---|---|
| *H01M 10/00* | (2006.01) |
| *H01M 10/54* | (2006.01) |
| *H01M 10/0525* | (2010.01) |
| *H01M 10/0569* | (2010.01) |
| *H01M 10/0562* | (2010.01) |

(52) U.S. Cl.
CPC ....... *H01M 10/54* (2013.01); *H01M 10/0525* (2013.01); *H01M 10/0562* (2013.01); *H01M 10/0569* (2013.01); *H01M 2300/008* (2013.01); *H01M 2300/0028* (2013.01)

(58) Field of Classification Search
CPC ............. H01M 10/54; H01M 10/0569; H01M 2300/0028; H01M 2300/008
See application file for complete search history.

(56) References Cited

U.S. PATENT DOCUMENTS

| | | | |
|---|---|---|---|
| 7,858,216 B2 | 12/2010 | Sloop | |
| 8,497,030 B2 | 7/2013 | Sloop | |
| 2007/0292746 A1* | 12/2007 | Sloop | .................. H01M 50/627 |
| | | | 429/49 |

FOREIGN PATENT DOCUMENTS

| | | | |
|---|---|---|---|
| CN | 108288738 A | 7/2018 | |
| WO | WO-2019060996 A1 * | 4/2019 | ............. C01D 15/08 |

OTHER PUBLICATIONS

E. Grothe et al., Solvates, Salts, and Cocrystals: A Proposal for a Feasible Classification System, Crystal Growth and Design, 16, pp. 3237-3243. (Year: 2016).*

(Continued)

*Primary Examiner* — Cynthia H Kelly
*Assistant Examiner* — Monique M Wills
(74) *Attorney, Agent, or Firm* — OLSON & CEPURITIS, LTD.

(57) ABSTRACT

A method for recovering a lithium electrolyte salt from spent batteries comprises first extracting electrolyte from shredded batteries (e.g., spent batteries at the end of their useful lifetime) with an organic carbonate solvent; concentrating the extracted electrolyte in vacuo to form a solid lithium electrolyte salt that is solvated with the organic carbonate; and then extracting solvent from the solvated, solid lithium electrolyte salt with supercritical $CO_2$ to purify the lithium electrolyte salt sufficiently for reuse in lithium batteries. In the first extraction, the organic carbonate solvent is selected based on the solubility of the lithium electrolyte salt in the solvent, as well as the volatility of the solvent to facilitate the concentration process. The supercritical $CO_2$ is preferably held at a pressure in the range of about 1,500 to about 30,000 psi and is passed through a bed or column of the solvated salt.

20 Claims, 2 Drawing Sheets

(56) References Cited

OTHER PUBLICATIONS

Grutzke, M. et al., Extraction of Lithium-Ion Battery Electrolytes With Liquid and Supercritical Carbon Dioxide and Additional Solvents, Royal Society of Chemistry Adv. 5, 43209-43217 (2015).
Grutzke, M. et al., Supercritical Carbon Dioxide Extraction of Lithum-Ion Battery Electrolytes, The Journal of Supercritical Fluids, J. of Supercritical Fluids 94, 216-222 (2014).
Monnighoff, X. et al., Supercritical Carbon Dioxide Extraction of Electrolyte From Spent Lithium Ion Batteries and Its Characterization by Gas Chromatography With Chemical Ionization, Journal of Power Sources 352, 56-63 (2017).
Nowak, S., The Role of Sub- and Supercritical CO2 as "Processing Solvent" for the Recycling and Sample Preparation of Lithium Ion Battery Electrolytes, Molecules 22 (403) (2017).
ReCell Advanced Battery Recycling Center, Second Quarter Progress Report, 1-102 (2020).
Schroeder, M.A. et al., The Relationship of Chemical Structure to Supercritical-Fluid Solubility and to Cosolvent-Modifier Properties: A Literature Review, U.S. Army Research Laboratory Report No. ARL-TR-745, 1-57 (1995).

* cited by examiner

METHOD FOR RECOVERING AND RECYCLING ELECTROLYTE SALTS FROM LITHIUM BATTERIES

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to a method for recovering and recycling electrolyte salts from lithium batteries.

BACKGROUND OF THE INVENTION

Spent lithium battery waste is on the rise and is projected to increase to millions of metric tons in the next 20 years as electric vehicle production and stationary energy storage capability increases. Profitable recycling of spent batteries will be critical to the industry as lithium battery usage increases. One component of lithium batteries that is not generally recycled is the electrolyte, and particularly the electrolyte salt, which is typically the most valuable component of the electrolyte. Recovery of lithium electrolyte salts, such as $LiPF_6$, can generate additional revenue for the battery recycling industry while at the same time eliminating another waste component. One issue with recovery of the lithium electrolyte salts is inclusion of electrolyte solvents within solid, solvated recovered salts. These solvents can be difficult to selectively remove from the solvated salts, since the salts are generally soluble in various extraction solvents, and the solvents are tenaciously held within the solvated salts, making removal difficult at atmospheric pressure as well as in vacuo. This is further exacerbated by the low decomposition temperature of $LiPF_6$ requiring the drying temperature to be kept low. For example, recovered from ethylene carbonate crystallizes as a mixed ethylene carbonate-$LiPF_6$ salt (i.e., X-ray diffraction analysis shows neither an ethylene carbonate structure, nor a $LiPF_6$ structure). Other carbonates, such as propylene carbonate, are even more problematic, since retained propylene carbonate will be released into the electrolyte solvent when the salt is reused in a lithium battery, and can intercalate into graphite-based anodes causing undesirable expansion.

There is an ongoing need for methods of recovering lithium electrolyte salts from spent lithium batteries with reduced solvent content. The methods described herein address this need.

SUMMARY OF THE INVENTION

A method for recovering a purified lithium battery electrolyte salt from battery waste comprises the steps of contacting supercritical carbon dioxide ($CO_2$) under pressure (e.g., at a pressure in the range of about 1,500 to about 30,000 pounds-per-square inch (psi), preferably at least about 2,000 psi) with a solvated, solid lithium electrolyte salt with, thereby extracting solvent from the electrolyte salt into the supercritical carbon dioxide to form a waste solution. The next step is separating the waste solution from the electrolyte salt. And the final step is recovering a purified, solid lithium electrolyte salt. The solvated salt in the first step is solvated with a solvent comprising an organic carbonate.

In some embodiments, the method includes steps to obtain the solvated solid lithium electrolyte salt from shredded battery waste before contacting with supercritical $CO_2$. In these embodiments, the first step is mixing shredded lithium batteries with an organic carbonate solvent (e.g., a solvent is selected from the group consisting of diethyl carbonate, dimethyl carbonate and ethyl methyl carbonate; preferably diethyl carbonate), thereby extracting a lithium salt-containing electrolyte away from solid battery materials. The next step is separating the solid battery materials from a liquid phase containing the electrolyte dissolved in the organic carbonate solvent. And the third step is concentrating the liquid phase via drying at atmospheric or reduced pressure to remove a majority of solvents and recover a solvated, solid lithium electrolyte salt therefrom. This solvated, solid lithium electrolyte salt is solvated with a solvent comprising an organic carbonate solvent, such as the organic carbonate used for the extraction, and may include other organic carbonate solvents or other electrolytes solvents from the waste batteries. This solvated salt is then purified with the supercritical $CO_2$ as described above.

Optionally, solvent extracted for the lithium electrolyte salt is recovered from the waste solution, e.g., by reducing the pressure of the supercritical carbon dioxide to a level where the carbon dioxide becomes a gas, which is then vented away from the solvent. In some embodiments, the pressure is reduced in two or more stages.

The supercritical carbon dioxide can be contacted with the solvated, solid lithium electrolyte salt by pumping the supercritical carbon dioxide through a bed or column of the electrolyte salt. Any lithium electrolyte salt that is insoluble in supercritical carbon dioxide can be purified by the methods described herein. In preferred embodiments, the electrolyte salt is $LiPF_6$.

The electrolyte salts recovered by the process described herein can be recycled by incorporating the recovered salts in new lithium batteries, either alone, or preferably as a mixture with a non-recycled lithium electrolytes salt.

Some advantages of the method described herein is that carbonate solvent can efficiently extract $LiPF_6$-containing electrolytes from shredded batteries, since the $LiPF_6$ is soluble in carbonates, and is commonly used in lithium batteries. Removal of the solvents by drying is incomplete, however, because residual carbonate solvent is strongly held in the electrolyte salt once it solidifies. The resulting solvated salt may not be suitable for use in lithium batteries, however, supercritical carbon dioxide does not substantially dissolve lithium electrolyte salts, such as $LiPF_6$, but does dissolve organic carbonate solvents from solvated lithium electrolyte salts. Using sequential extraction of the electrolyte from the shredded batteries, and then extraction of solvent from the solvated lithium electrolyte salt with supercritical carbon dioxide results in a much purer final electrolyte salt. At least about 90 percent of propylene carbonate (PC) can be removed from PC-solvated $LiPF_6$ with supercritical carbon dioxide at 2,000 psi. This is important because, as noted above, PC can intercalate into graphite-based anodes causing undesirable expansion. Thus, if too much PC is present in the recovered $LiPF_6$, this could render the material unsuitable for use in lithium batteries that have a graphite-based anode.

The methods described herein comprise certain novel features hereinafter fully described, which are illustrated in the accompanying drawings, and particularly pointed out in the appended claims. It is to be understood that various changes in the details may be made without departing from the spirit, or sacrificing any of the advantages of the systems, electrochemical reactors, and methods described herein.

DETAILED DESCRIPTION OF THE PRESENT INVENTION

Methods for recovering and purifying lithium electrolyte salts from spent battery electrolytes are described herein. In some embodiments, the methods couple separate, sequential solvent extraction and supercritical carbon dioxide extraction processes to significantly improve the purity of recovered lithium electrolyte salts, such as $LiPF_6$ from spent lithium batteries. The recovered salts are of a purity level sufficient for recycling and reuse in lithium batteries.

In some embodiments the method comprises first extracting electrolyte containing a lithium electrolyte salt from shredded batteries (e.g., spent batteries at the end of their useful lifetime) with an organic carbonate solvent; concentrating the extracted electrolyte in vacuo to form a solid lithium electrolyte salt that is solvated with an organic carbonate. The solvated salt is then purified by extracting solvent from the solvated, solid lithium electrolyte salt with supercritical $CO_2$ to purify the lithium electrolyte salt sufficiently for reuse in lithium batteries. Of course, it is to be understood that the supercritical $CO_2$ purification can be performed on any lithium salt that is solvated with an organic carbonate, regardless of whether the salt was extracted from batteries. In the first extraction, the organic carbonate solvent is selected based on the solubility of the lithium electrolyte salt in the solvent, as well as the volatility of the solvent, to facilitate the concentration process. The supercritical $CO_2$ is preferably held at a pressure in the range of about 1,500 to about 30,000 psi and is passed through a bed or column of the solvated salt. Alternatively, the supercritical $CO_2$ can be contacted with the solvated salt with agitation and then drained or pumped away. Solvent extracted from the solvated, solid electrolyte salt can be recovered as well by evaporating the $CO_2$ after removal from the salt.

Suitable organic carbonate solvents for extracting the electrolyte from the shredded battery materials include, e.g., diethyl carbonate, dimethyl carbonate, and ethyl methyl carbonate. A preferred organic carbonate is diethyl carbonate.

Inorganic salts generally have a fairly low solubility in supercritical $CO_2$ (see e.g., M Schoeder, R A Fifer, and J B Morris, U.S. Army Research Laboratory Report No. ARL-TR-745 *"The Relationship of Chemical Structure to Supercritical Fluid Solubility and to Co-Solvent-Modifier Properties: A Literature Review"* June 1995, pages 1-57; particularly pg. 7), thus any lithium salt useful in lithium battery systems would be suitable for purification by the methods described herein. For example, electrolyte salts such as $LiPF_6$, $LiClO_4$, and Li(TFSI) would be suitable for purification and recovery by the methods described herein. A preferred electrolyte salt is $LiPF_6$.

Figure 1:
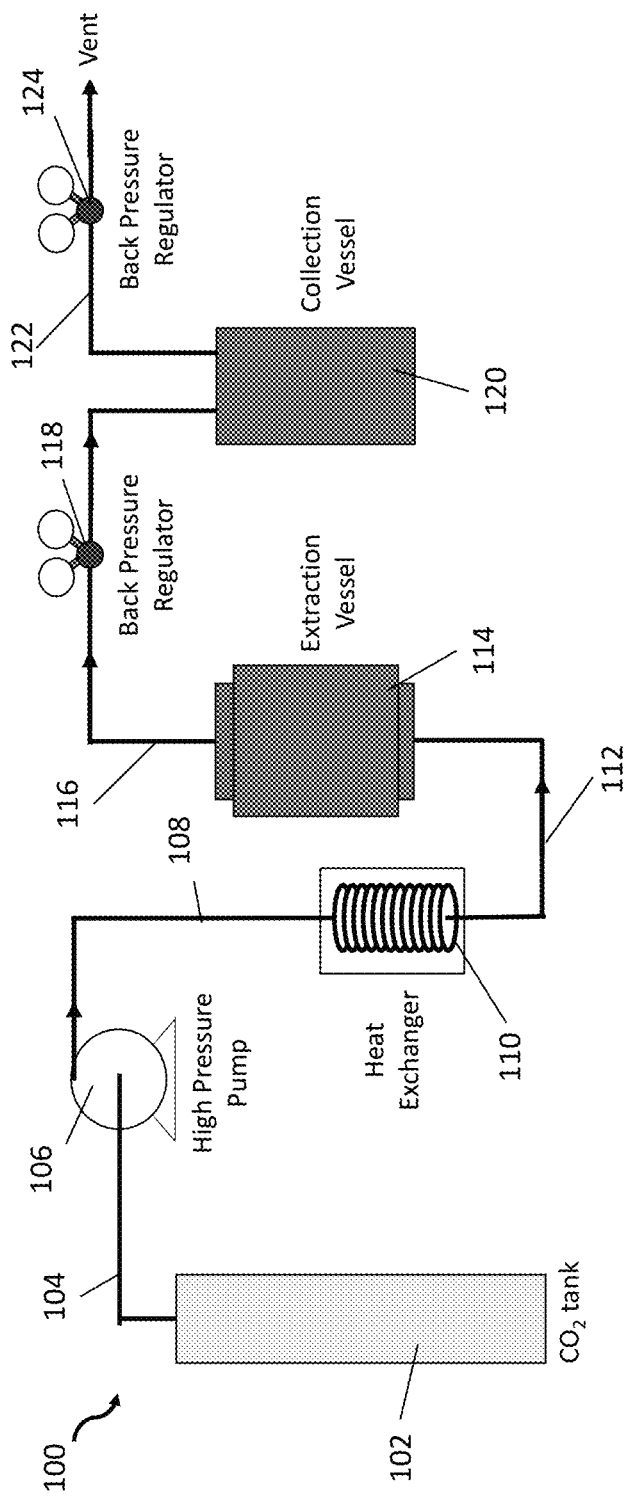
FIG. 1 provides a schematic illustration of an apparatus for supercritical carbon dioxide extraction of solvents from solvated, solid lithium electrolyte salt, such as $LiPF_6$.

FIG. 1 provides a schematic illustration of an exemplary system for extracting solvent from a solvated, solid lithium electrolyte salt. System 100 comprises $CO_2$ source 102 (e.g., a $CO_2$ tank) connected to a high-pressure pump 106 by gas line 104. The $CO_2$ is pressurized by pump 106 and transferred into heat exchanger 110 through gas line 108 to cool the pressurized gas and for supercritical $CO_2$. The supercritical $CO_2$ is passed through line 112 into extraction vessel 112. In use vessel 112 is filled or partially filled with a bed or column of a solvated, solid lithium electrolyte salt to be purified and desolvated. The supercritical $CO_2$ flows through the bed or column of the electrolyte salt and extracts solvents out of the solid salt and into the supercritical $CO_2$. The resulting solution of solvent in supercritical $CO_2$ flows through line 116 which includes a back-pressure regulator 118, and then into collection vessel 120. Pressure in vessel 120 is reduced by second back pressure regulator 124 so that $CO_2$ evaporates away through line 122, and solvent extracted from the salt collects in vessel 120.

Example 1

Figure 2:
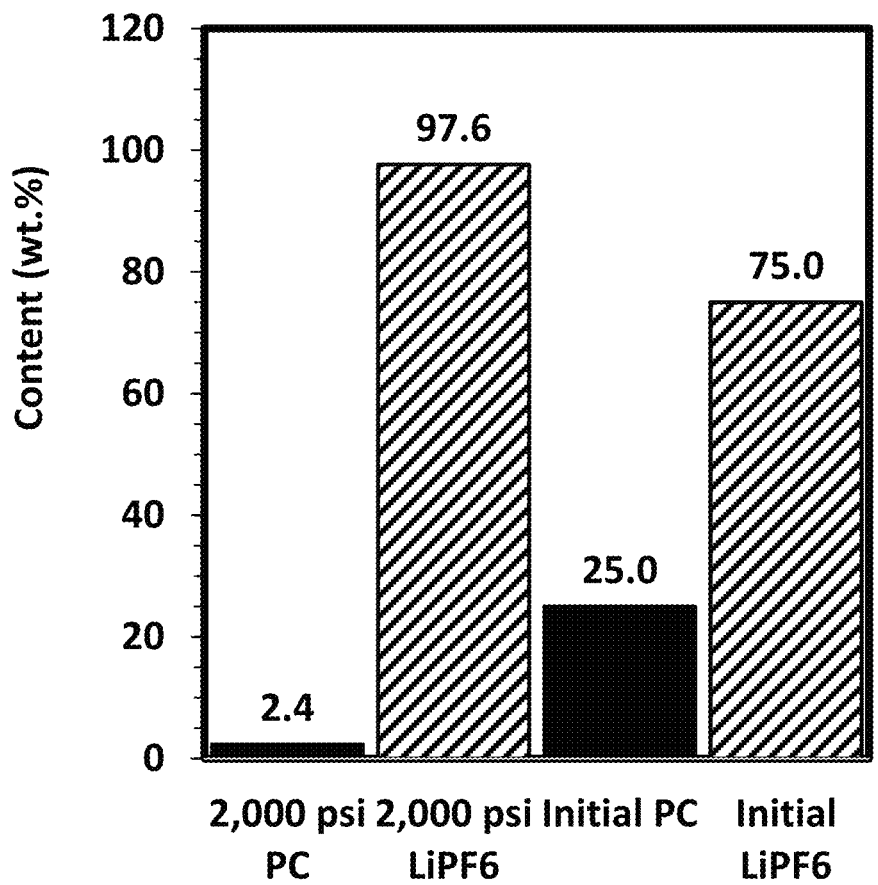
FIG. 2 provides a bar graph of $LiPF_6$ and propylene carbonate content of $PC/LiPF_6$ before and after extraction with supercritical $CO_2$ according to the method described herein.

Extraction of PC from $LiPF_6$ was performed on a simple mixture of $LiPF_6$ and PC with a concentration of about 25 wt. % PC. This material was then wrapped in filter paper before being placed in a supercritical $CO_2$ extractor. The extractor was then pressurized with $CO_2$ to 2000 psi at about 30° C. The pressure was held for 15 minutes (min) and then a valve was opened to start to allow $CO_2$ to flow into the first separation stage. The pressure was maintained at about 1,400 psi in the extractor and about 1,200 psi in the first separation stage for 5 min by continuously pumping the $CO_2$ into the extractor and allowing excess pressure from the first separation stage to flow into the second separation stage, which is held at near atmospheric pressure. After this dynamic phase the pressure was allowed to slowly drop to atmospheric pressure in both the extractor and first separation stage. The materials were then collected from the extractor and analyzed using nuclear magnetic resonance with trifluoroethanol as a reference. The results of the extraction are shown graphically in FIG. 2, which demonstrate removal of about 90% of the PC from the material.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing materials or methods (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the materials or methods described herein and does not pose a limitation on the scope of the claims unless otherwise stated. No language in the specification should be construed as indicating any non-claimed element as essential to the practice of the claims.

Preferred embodiments are described herein, including the best mode known to the inventors for carrying out the claimed invention. Variations of those preferred embodiments may become apparent to those of ordinary skill in the art upon reading the foregoing description. The inventors expect skilled artisans to employ such variations as appropriate, and the inventors intend for the claimed invention to be practiced otherwise than as specifically described herein. Accordingly, the claimed invention includes all modifications and equivalents of the subject matter recited in the claims appended hereto as permitted by applicable law. Moreover, any combination of the above-described elements in all possible variations thereof is encompassed by the claimed invention unless otherwise indicated herein or otherwise clearly contradicted by context.

The invention claimed is:

1. A method for recovering a purified lithium battery electrolyte salt from battery waste; the method comprising the sequential steps of:
    (a) contacting supercritical carbon dioxide under pressure with a solvated, solid lithium electrolyte salt, thereby extracting solvent from the solvated electrolyte salt into the supercritical carbon dioxide to form a waste solution, and wherein the electrolyte salt is solvated with a solvent comprising an organic carbonate;
    (b) separating the waste solution from the electrolyte salt; and
    (c) recovering a purified, solid lithium electrolyte salt comprising a lower level of the organic carbonate solvent than the solvated, solid lithium electrolyte salt in step (a).

2. The method of claim 1, further comprising before step (a) the additional sequential steps of:
    (i) mixing an organic carbonate solvent with shredded lithium batteries containing an electrolyte comprising a lithium electrolyte salt, thereby extracting the electrolyte away from solid battery materials;
    (ii) separating the solid battery materials from a liquid phase containing the electrolyte dissolved in the organic carbonate solvent;
    (iii) concentrating the liquid phase via heating at atmospheric or reduced pressure to remove solvents and recover the solvated, solid lithium electrolyte salt therefrom.

3. The method of claim 1, wherein solvent extracted from the lithium electrolyte salt is recovered from the waste solution.

4. The method of claim 3, wherein the solvent is recovered from the waste solution by reducing the pressure of the supercritical carbon dioxide to a level where the carbon dioxide becomes a gas, which is then vented away from the solvent.

5. The method of claim 4, wherein the pressure is reduced in two or more stages.

6. The method of claim 1, wherein the supercritical carbon dioxide in step (a) is at a pressure in the range of about 1,500 to about 30,000 pounds-per-square inch (psi).

7. The method of claim 6, wherein the supercritical carbon dioxide in step (a) is at a pressure of at least about 2,000 psi.

8. The method of claim 1, wherein the supercritical carbon dioxide is contacted with the solvated, solid lithium electrolyte salt in step (a) by pumping the supercritical carbon dioxide through a bed or column of the solvated, solid lithium electrolyte salt.

9. The method of claim 1, wherein the solvated, solid lithium electrolyte salt comprises $LiPF_6$.

10. The method of claim 2, wherein the lithium electrolyte salt in step (i) comprises $LiPF_6$.

11. The method of claim 2, wherein the organic carbonate solvent is selected from the group consisting of diethyl carbonate, dimethyl carbonate, and ethyl methyl carbonate.

12. A method for recovering $LiPF_6$ from battery waste; the method comprising the steps of:
    (a) mixing an organic carbonate solvent with shredded lithium batteries comprising a $LiPF_6$-containing electrolyte, thereby extracting the electrolyte away from solid battery materials;
    (b) separating the solid battery materials from a liquid phase containing the electrolyte dissolved in the organic carbonate solvent;
    (c) concentrating the liquid phase via heating at atmospheric or reduced pressure to remove solvents and recover a solvated, solid $LiPF_6$ therefrom which is solvated with a solvent comprising the organic carbonate;
    (d) pumping supercritical carbon dioxide through a bed or column of the solvated, solid $LiPF_6$, thereby extracting solvent from the $LiPF_6$ into the supercritical carbon dioxide to form a waste solution; and
    (e) recovering a purified, solid $LiPF_6$.

13. The method of claim 12, wherein solvent extracted from the $LiPF_6$ is recovered from the waste solution.

14. The method of claim 13, wherein the solvent is recovered from the waste solution by reducing the pressure of the supercritical carbon dioxide to a level where the carbon dioxide becomes a gas, which is then vented away from the solvent.

15. The method of claim 14, wherein the pressure is reduced in two or more stages.

16. The method of claim 12, wherein the supercritical carbon dioxide in step (d) is at a pressure in the range of about 1,500 to about 30,000 pounds-per-square inch (psi).

17. The method of claim 16, wherein the supercritical carbon dioxide in step (d) is at a pressure of at least about 2,000 psi.

18. The method of claim 12, wherein the solvated, solid $LiPF_6$ is solvated with a solvent comprising propylene carbonate.

19. The method of claim 12, wherein the organic carbonate solvent in step (a) is selected from the group consisting of diethyl carbonate, dimethyl carbonate, and ethyl methyl carbonate.

20. The method of claim 12, wherein the organic carbonate solvent in step (a) is diethyl carbonate.

\* \* \* \* \*